United States Patent
Hellström

[11] Patent Number: 5,207,475
[45] Date of Patent: May 4, 1993

[54] DEVICE AT HOLLOW BEAMS FORMING A PART OF A CAR BODY

[75] Inventor: Michael Hellström, Mölndal, Sweden

[73] Assignee: AB Volvo, Gothenburg, Sweden

[21] Appl. No.: 768,875

[22] PCT Filed: Apr. 26, 1990

[86] PCT No.: PCT/SE90/00279
§ 371 Date: Oct. 23, 1991
§ 102(e) Date: Oct. 23, 1991

[87] PCT Pub. No.: WO90/13467
PCT Pub. Date: Nov. 15, 1990

[30] Foreign Application Priority Data
Apr. 28, 1989 [SE] Sweden .................. 8901550

[51] Int. Cl.⁵ .................................... B60R 27/00
[52] U.S. Cl. .................... 296/188; 296/209
[58] Field of Search ............... 296/188, 209, 30, 204, 296/205

[56] References Cited

U.S. PATENT DOCUMENTS

| 2,327,585 | 8/1943 | Ulrich | 296/30 X |
| 3,132,891 | 5/1964 | Pyuro et al. | |
| 4,307,911 | 12/1981 | Pavlik | 296/188 |
| 4,462,633 | 7/1984 | Maeda | |
| 4,892,350 | 1/1990 | Kijima | 296/188 X |

FOREIGN PATENT DOCUMENTS

| 0037587 | 10/1981 | European Pat. Off. | |
| 19054 | 6/1956 | Fed. Rep. of Germany | 296/188 |
| 2645163 | 10/1976 | Fed. Rep. of Germany | |
| 53966 | 5/1981 | Japan | 296/209 |
| 783098 | 11/1980 | U.S.S.R. | 296/204 |
| 2187686 | 11/1986 | United Kingdom | |

Primary Examiner—Russell D. Stormer
Assistant Examiner—Gary C. Hoge
Attorney, Agent, or Firm—Merchant & Gould, Smith, Edell, Welter & Schmidt

[57] ABSTRACT

A structure for forming hollow beams within a car body. The beams are stiffened in their transverse direction by means of cross frames. The cross frames may have a tubular member arranged transversely to the axial length. At one end there may be provided at least partially formed side flanges which are firmly attached to the beam. The length of the tubular member is preferably at least slightly shorter than the distance between the opposite longitudinal sides forming a free space between the other end of the tubular member and one of the longitudinal sides of the beam.

5 Claims, 2 Drawing Sheets

DEVICE AT HOLLOW BEAMS FORMING A PART OF A CAR BODY

The present invention concerns a device at especially superficially situated hollow beams, eg. sill beams, contained in a car body, which beams in the lateral direction are made rigid by means of transverse frames.

BACKGROUND OF THE INVENTION

At lateral collisions the sill of a car is exposed to large stress, since they are often exposed to direct collision forces from the colliding vehicle. Since the forces also influences parts of the car body higher up, a torsional moment is generated, which makes the sill beam and the lateral beam to twist upwards, inwards. The car body therefore does not constitute the protection against lateral collisions as would be desireable.

The problem has been observed in many quarters and now there is detailed legislation relating to how large forces the car body should be able to absorb from the side. In order to counteract the above mentioned torsional tendencies, there have been attempts to among others inject isocyanates in the sill beam. This however gives problem with moisture and thereby corrosion in the long run.

It is previously known by self-supporting car bodies to arrange hollow beams, which are made rigid by transverse frames and/or diagonal frames inside the hollow beam. These beams in fact are effective, but increases the weight of the vehicle with quite a number of kilos, which cannot be accepted today. The division of hollow beams into a number of smaller cells also leads to an increasing risk for corrosion.

THE OBJECT OF THE INVENTION AND MOST IMPORTANT FEATURES

The object of the present invention is to provide a stiffening device of the kind mentioned by way of introduction, which stiffens the car body against lateral forces at lateral collisions, but also gives an improved stiffening at pitching and rolling movements.

An other object of the invention is that the stiffening device should have low weight, permit free passage of ventilating air and corrosion preventive means through the beam. Moreover the structure should be simple and be suitable for mass production and be designed such that it can be handled by a robot. These objects have been solved by each cross frame being formed by a tubular piece transverse to the longitudinal axis of the beam, said tubular piece at one end being provided with side flanges, which are firmly joined to the beam, and that the length of the tubular piece is at least somewhat shorter than the distance between opposite longitudinal sides, forming a free space between the other end of the tubular piece and one of the longitudinal sides of the beam.

DESCRIPTION OF THE DRAWINGS

The invention will be described in more detail below with reference to the appended drawings, which show an embodiment.

DESCRIPTION OF EMBODIMENTS

Figure 1:
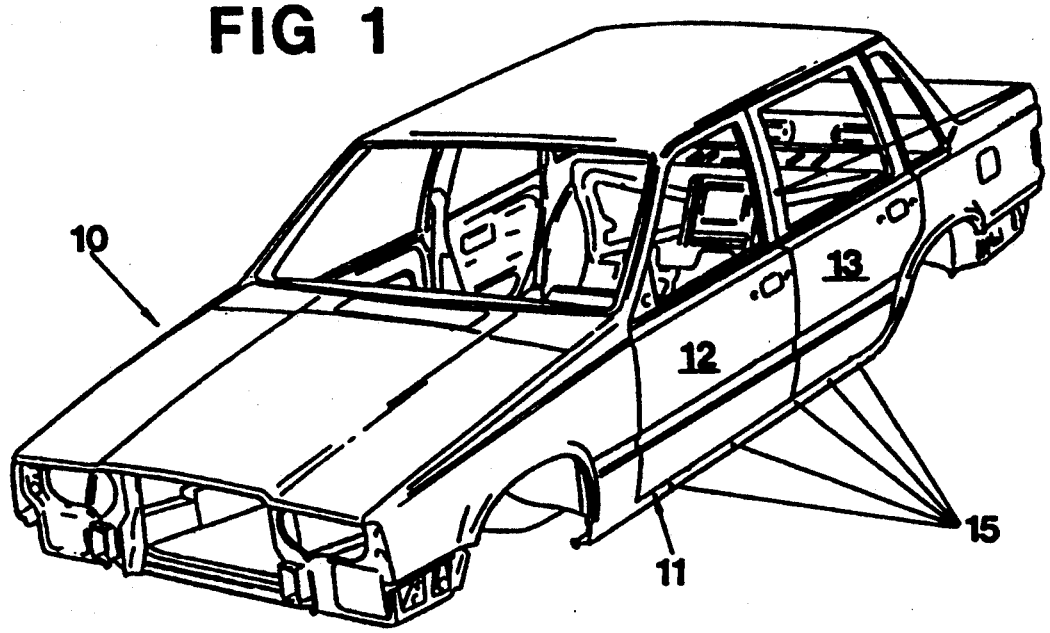
FIG. 1 shows in perspective a passenger car body provided with hollow beams reinforced with cross frames according to the invention.
Figure 3:
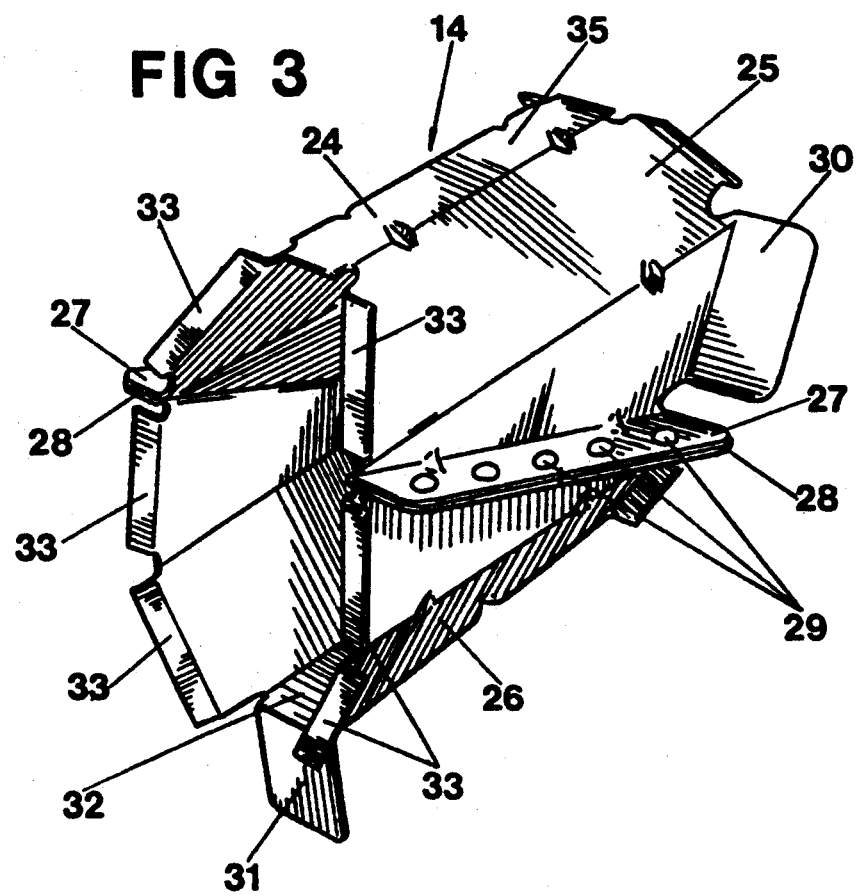
FIG. 3 illustrates in perspective a cross frame according to the invention.

In FIG. 1 is illustrated a passenger car body provided with hollow sill beams 11 below the doors 12 and 13, and in which sill beam a number of cross frames 14 are provided, the position of which is indicated with reference designations 15.

Figure 2:
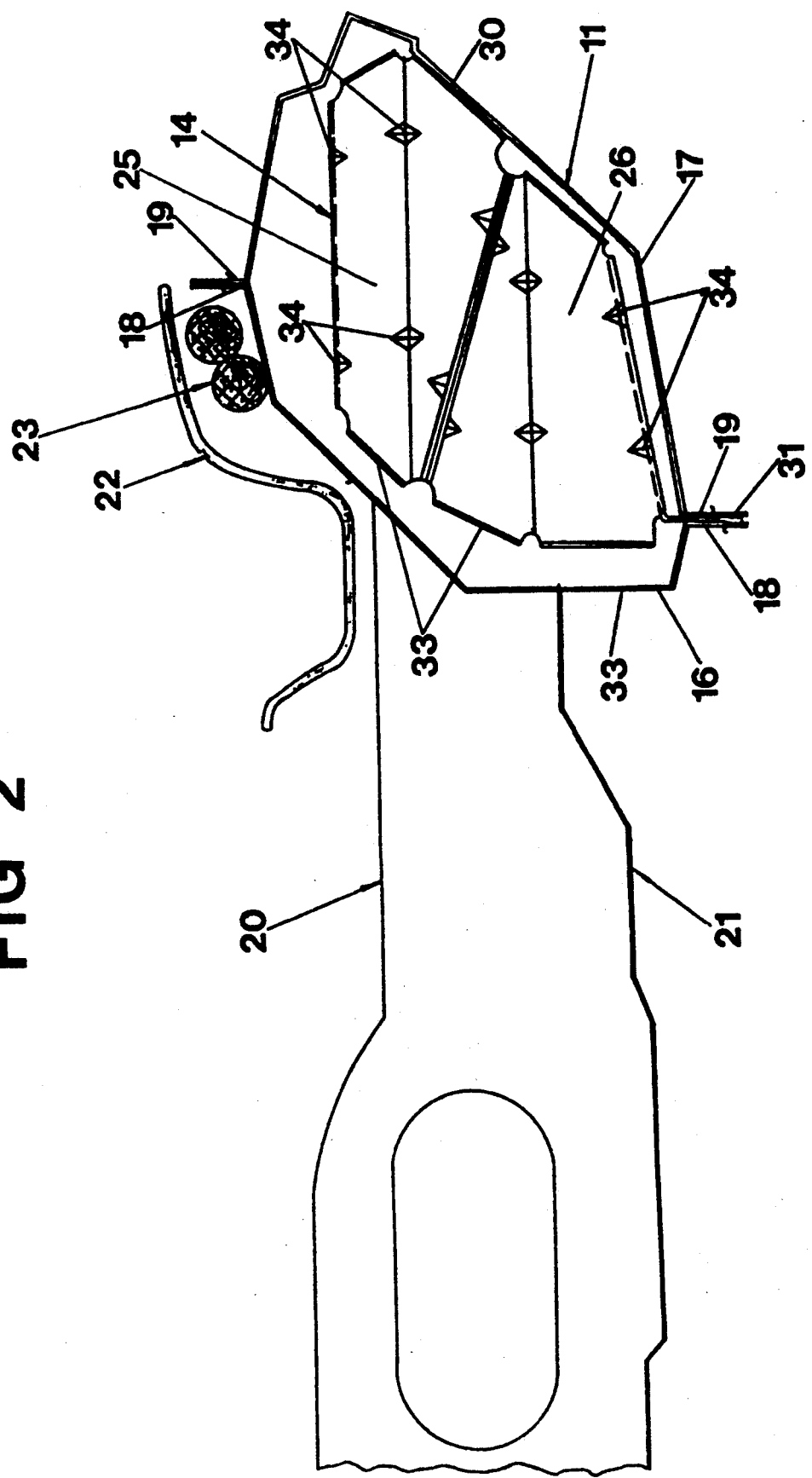
FIG. 2 shows in larger scale a section through the sill beam to the car body shown in FIG. 1.

The sill beam 11 in the embodiment shown in FIG. 1 and 2 has a section form, which is essentially constant, and which sill beam in cross section has the form of an irregular polyhedron adapted to the local conditions. The sill beam 11 consists of two halves 16 and 17, each provided with mounting flanges 18 and 19, which by means of spot welding are joined to each other forming a hollow beam. The vertical parting planes of the beam at the top and at the bottom are displaced with respect to each other. To one half 16 of the sillbeam is connected a cross beam 20 and to this mounted a floor 21. 22 designates a sill panel and 23 a number of cables hidden under the panel.

The cross frames inside the sill beam 11 are formed by tubular members 24 arranged transversally to the longitudinal axis of the beam, which tubular members in cross section are polygon shaped, in the shown embodiment in the form of an octagonal. Even the tubular member 24 is composed of two halves 25 and 26, the parting plane of which is diagonally oriented versus the longitudinal direction of the tube. In the parting plane each half 25 and 26 is provided with connection flanges 27 and 28 which are connected to each other by means of spot weldings 29.

One of the bevelled ends of the tubular member 24 is provided with two thick side flanges 30 which have the same inclination as the part of the inside of the beam against which the side flanges is connected to by means of spot weldings.

The tubular member 24 has been given a somewhat shorter length than the distance between the opposite longitudinal sides of the sill beam 11, so that between the free end of the tubular member and one of the longitudinal sides of the sill beam there is formed a free space. The mounting of the the other end of the tubular member 24 has been provided by means of a downfolded or upfolded sheet lug 31, which is an extension of the bottom part 32 or the top part 35 of the tubular member. The sheet lug 31 is inserted between the lower connection flanges 18 and 19 of the sill beam, and fixedly connected with these by spot welding. In the connection flange 18 and/or 19 are provided, eg pressed pockets in which the sheet lug may be inserted during mounting.

In order to better transmit the deformation forces from the outside of the sill beam to the inside of the same, the free end of the tubular member is provided with pressure distributing flanges 33, which transmit the collision forces to the inner sill beam half 16 and further to the crossbeam 20 and the floor 21. In order to further stiffen the tubular member this is preferably provided with a number of ridge shaped embossings 34, which are preferably placed in the foldings. As can be seen from FIG. 2 the tubular member is designed somewhat smaller than the internal cross section of the sill beam so that air or a fluid can freely flow past the tubular members. The special mounting of the tubular member results in that vibrations of the car body does not give rise to rattling noise. Despite their small weight, the tubular members are very strong cross frames, which effectively stiffen the sill beam as well as the entire bottom structure of the car body.

I claim:

1. A low weight stiffening tubular cross frame for reinforcing the interior of a hollow sill beam which is located longitudinally along the exterior of an automobile body, the hollow sill beam being formed by an inner sill half and an outer sill half, said tubular cross frame comprising at least two members and having a first and second end arranged transversely to the longitudinal axis of the sill beam, said members including side flanges attached proximate to said first end of said cross frame, said side flanges fixedly connected to one of said sill halves, said tubular cross frame being shorter in length than the distance between the inner sill half and the outer sill half, whereby a free space exists between said second end of said tubular cross frame and the opposite of said sill halves.

2. The apparatus of claim 1 further including a sheet lug attached proximate to said second end of said tubular cross frame for attachment to the hollow sill beam.

3. The apparatus of claim 2 wherein the inner sill and the outer sill are two separate and distinct members, said sheet lug is attached to the hollow sill beam at the point where the inner sill is attached to the outer sill.

4. The apparatus of claim 3 wherein said members form said tubular cross frame in two halves joined at a connecting flange, said connecting flange defining a parting plane diagonally oriented to the center axis of said tubular cross frame.

5. A stiffening device to protect automobiles during lateral collision comprising:

an automobile body with a hollow sill beam located longitudinally along the exterior of said automobile body, said hollow sill beam having an inner sill and an outer sill;

a low weight stiffening device for insertion into said hollow sill beam 11 having a plurality of members forming a tubular cross frame with a first and second end arranged transversely to the longitudinal axis of said hollow sill beam; and a side flange attached proximate to said first end of said tubular cross frame, said side flange fixedly connected to said outer sill, said tubular cross frame 14 being shorter in length than the distance between said inner sill and said outer sill, whereby a free space exists between said second end of said tubular cross frame 14 and said inner sill.

* * * * *